Dec. 31, 1935.  P. G. SCHLEMMER  2,026,403
MACHINE FOR MAKING CONTAINERS
Filed Jan. 9, 1934   2 Sheets-Sheet 1
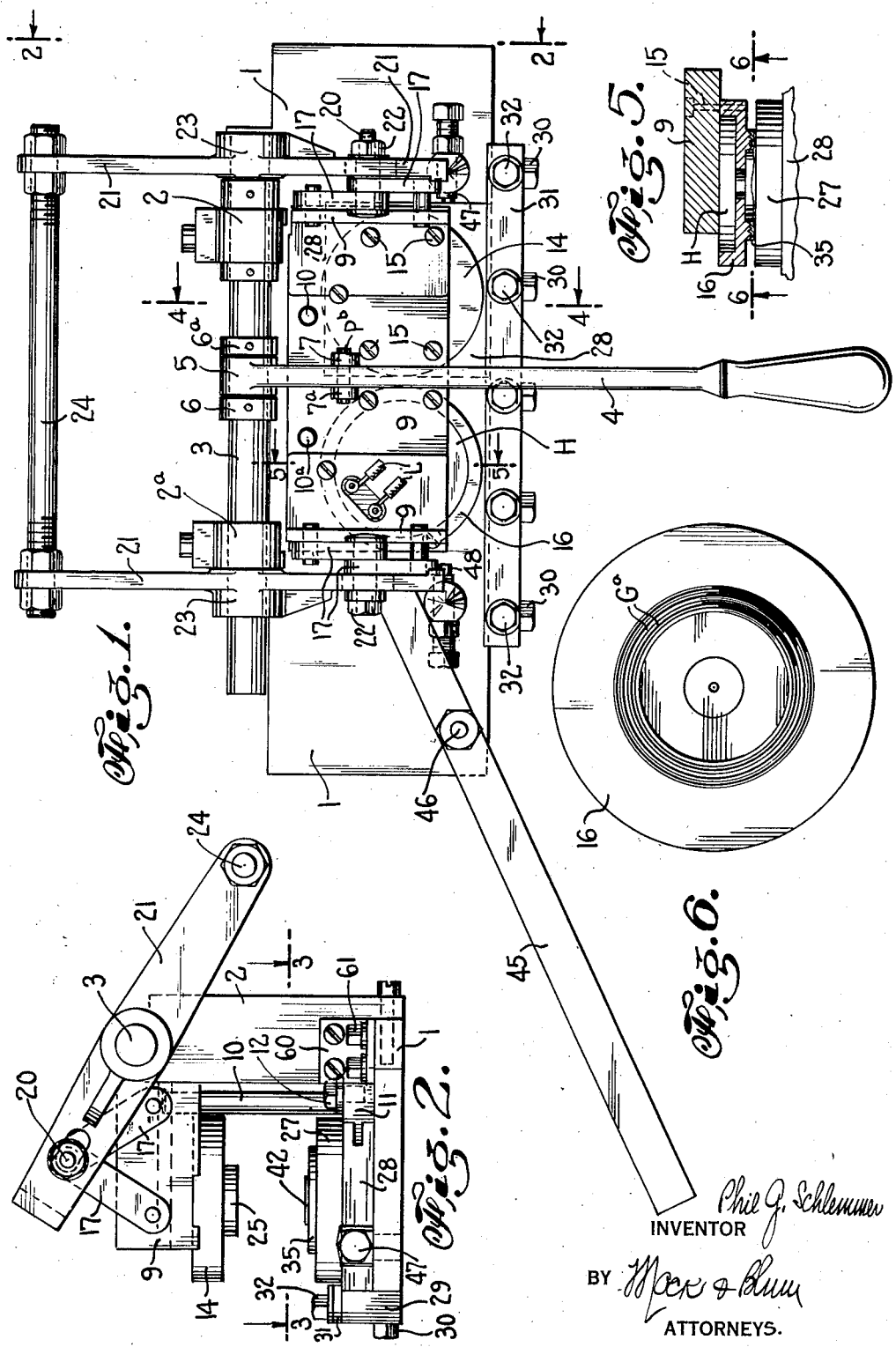
INVENTOR
Phil G. Schlemmer
BY Mack & Blum
ATTORNEYS.

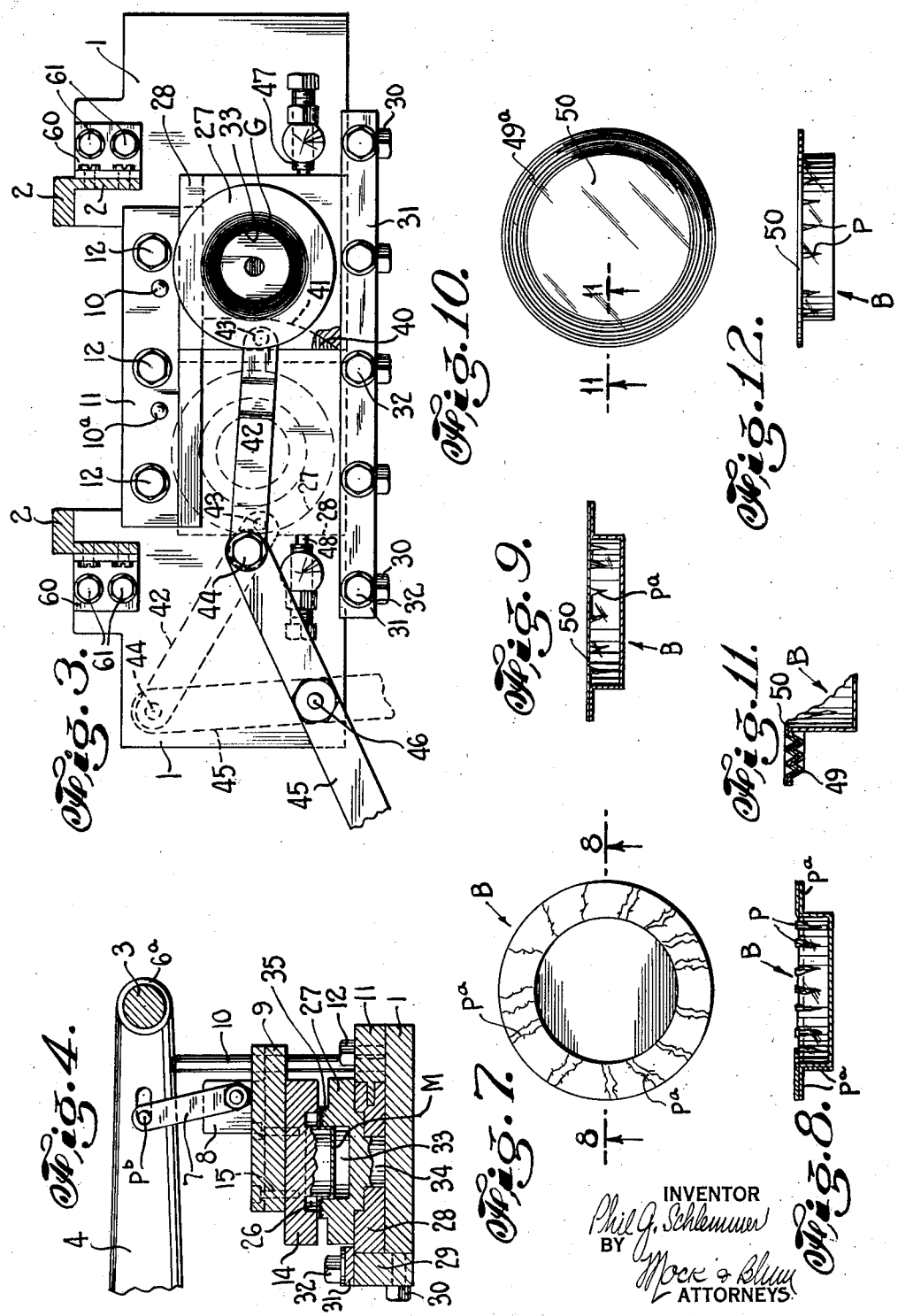

Patented Dec. 31, 1935

2,026,403

UNITED STATES PATENT OFFICE 2,026,403

MACHINE FOR MAKING CONTAINERS

Phil G. Schlemmer, Nanuet, N. Y., assignor, by mesne assignments, to Rose Barbara Henderson, Nanuet, N. Y.

Application January 9, 1934, Serial No. 705,861

5 Claims. (Cl. 93—60)

My invention relates to a new and improved machine for making containers.

One of the objects of my invention is to provide an improved machine for making containers from "Cellophane" and similar material.

Another object of my invention is to provide a machine which shall shape a flat piece of material, such as paper, "Cellophane" or the like, so as to provide a container having a body which is provided with a flange at its mouth, said body being preferably of tubular construction and preferably having a closed bottom end.

Another object of my invention is to provide a machine which shall manufacture a cover for the container.

Another object of my invention is to provide a machine for making tubular containers which are suitable for holding various powdered materials such as powder extracts and the like.

Another object of my invention is to provide a machine for manufacturing a container which is made of "Cellophane" or other suitable light-permeable material so that the containers can be used for packing powder puffs and other articles which are to be displayed to the prospective purchasers.

Other objects of the invention will be set forth in the following description and drawings which illustrate a preferred embodiment thereof, it being understood that the above general statement of the objects of my invention is intended merely to generally explain the same and not to limit it in any manner.

The invention also covers the improved method which is described herein.

Fig. 1 is a top plan view of mechanism which may be used for carrying out the invention.

Fig. 2 is an end elevation on the line 2—2 of Fig. 1.

Fig. 1 shows the forming members in the closed position and Fig. 2 shows said forming members in the open or inoperative position.

Fig. 3 is a sectional view on the line 3—3 of Fig. 2, this view being partially in plan.

Fig. 4 is a sectional view on the line 4—4 of Fig. 1.

Fig. 5 is a sectional view on the line 5—5 of Fig. 1.

Fig. 6 is a sectional view on the line 6—6 of Fig. 5.

Fig. 7 is a top plan view which illustrates the first operation in forming the container from a flat piece of material.

Fig. 8 is a sectional view on the line 8—8 of Fig. 7.

Fig. 9 shows the device illustrated in Fig. 8, with a covering sheet applied thereto. This illuserates the second step in the manufacture of the container.

Fig. 10 is a top plan view of the completed article.

Fig. 11 is a sectional view on the line 11—11 of Fig. 10.

Fig. 12 is a side elevation of Fig. 10.

Referring to Fig. 1, the machine is provided with a suitable base 1 having upright standards 2 and 2ª. A rod 3 is suitably mounted in these standards.

An operating arm 4 is provided with a collar 5, which is turnably mounted upon the rod 3. The rod 3 is provided with collars 6 and 6ª, which are secured to said rod 3, so as to prevent any lateral movement of the collar 5.

As shown in Figs. 1 and 4, links 7 and 7ª are provided with pins $P^b$ which are located in slots or holes of the operating arm 4. When the arm 4 is turned downwardly, said links 7 and 7ª are also moved downwardly. The links 7 and 7ª are pivotally connected at their lower ends to a lug 8 of a block 9, which is guided for vertical movement by means of upright rods 10 and 10ª, whose lower ends are suitably connected to a plate 11, which is suitably connected to the base 1. The plate 11 is connected to the base 1 by means of bolts 12.

Top dies 14 and 16 are suitably connected to the underside of the vertically movable plate 9, by means of screws 15. Additional means are provided to guide the up and down vertical movement of the plate 9.

As shown in Fig. 1, this plate 9 has a general rectangular contour.

Referring to Fig. 2, each lateral face of the plate 9 is provided with links 17, whose lower ends are pivotally connected to said lateral face. At their upper ends each said pair of links 19 is connected to a common pivot member 20 and said pivot member 20 is connected to an arm 21 by means of a nut 22.

There is a slight lost motion between pivot members 20 and arms 21, in order to permit the arms 21 to turn while the plate 9 moves in a vertical path.

As shown in Fig. 1 there are two such arms 21, each of which is provided with a suitable bearing sleeve 23, which turns upon the rod 3.

At their outer ends said turnable arms 21 are connected by a tie-rod 24.

As shown in Figs. 2 and 4, the upper die 14 is provided with a solid depending flange 25.

In this particular embodiment the die 14 and its depending flange 25 are of circular contour but I do not wish to be limited to any particular shape.

As shown in Fig. 4, the die 14 is provided with a recess 26 in its lower face and said recess is of annular shape and it surrounds the depending flange 25. The die 14 cooperates with a lower die 27 whose bottom face is provided with a downwardly projecting neck 34, which is located in a corresponding recess of a block 28, which rests upon the base 1.

As shown in Fig. 4, the plate 11 is provided with a tongue which enters a groove in the block 28, so that the block 28 is slidably held in position at one side. At its other side the block 28 is held in position by means of a clamping member 29 which is secured to the base 1 by means of bolts 30. A head 31 is clamped to the member 29 by means of bolts 32, and said head 31 overlies one side of the block 28, and clamps that side against the base 1. The lower die 27 can be connected to the block 28 by means of a drive fit or by any other suitable means.

As shown in Fig. 4, the lower die 27 is provided with a central cup-shaped recess 33, which is of circular contour, in this particular embodiment.

Likewise, and as shown in Fig. 4, the lower die 27 is provided with an upstanding annular shoulder 35.

As shown in Figs. 3 and 4, this annular shoulder 35 is provided with a series of concentric grooves G, said grooves being of V-shaped cross-section.

In order to utilize the dies 14 and 27, a sheet of the material is placed upon the shoulder 35 of the lower die 7. The arm 4 is now pulled down, so as to move the die 14 from the position shown in Fig. 2, to the position shown in Fig. 4. The flange 25 first engages the material and said flange 25 initially forces the central part of the sheet of material M into the recess 33 of the lower die 27. The lower annular face of the upper die 14 then clamps the edge of the material against a part of the annular shoulder 35 of the lower die 27.

The dies 14 and 27 are made of hardened steel, so that they operate like a pair of punches to cut off the superfluous edge part of the material.

The effect of forcing the central part of the sheet of material into the recess 34, is to form partial plaits in the upstanding wall of the cup-shaped member which is thus formed. Such partial plaits are also formed in the top flange of said cub-shaped member.

The inner edge of the annular bottom face of the upper die 14 cooperates with the adjacent groove G, in order to cut or trim the edge of the piece of material M.

The effect of the operation of the dies 14 and 27, is to produce the blank B which is shown in Fig. 8. Fig. 8 shows the partial plaits P in the upstanding wall of the blank B, and it also shows the plaits P<sup>a</sup> which have been formed in the flange of said blank B. As shown in Fig. 7, the plaits P<sup>a</sup> radiate outwardly. The lower die 27 is longitudinally shiftable, so that it can cooperate with the second die 16.

As shown in Fig. 3, the block 28 is of of general rectangular contour, save that one lateral face thereof is provided with a groove 40. This groove 40 is located intermediate the top and bottom faces of said block 28, and it has the tapered shape which is indicated by the line 41 in Fig. 3.

A link 42 has its end located within said groove 40, and the inner end of said link 42 is pivotally connected by means of a pin 43 to the die 27. The outer end of the link 42 is pivotally connected at 44 to a lever 45, which is pivotally connected to the base 1, by means of a pin 46. When the lever 45 is in the full line position shown in Fig. 3, the die 27 is underneath the die 14. When the lever 45 has been shifted to the dotted line position shown in Fig. 3, the plate 28 and the die 27 have been shifted to the dotted line position shown in Fig. 3, which is underneath the die 16. When it is necessary to shift plate 28, the clamping means 30 and 32 are loosened.

Adjustable stops 47 and 48 are provided for limiting the longitudinal movement of the block 28 and the die 27. The upper die 16 is provided with an electrical heater H of any suitable type.

As shown in Fig. 5, the underside of the die 16 is provided with an annular shoulder having grooves which correspond to the previously mentioned grooves G. Hence when the die 16 is forced into the position shown in Fig. 5, its grooves mesh with said grooves G so that the V-shaped ridges which are formed intermedate the grooves G, and these ridges enter the corresponding V-shaped depressions which are provided at the bottom face of the die 16. The effect of this is to form circular corrugations 49 in the blank B and the walls of these corrugations have portions of more than one thickness, corresponding to the plaits P<sup>a</sup>.

Prior to utilizing the die 16, the blank B can have the material placed therein, and a cover piece 50 is placed over the flange of the blank B. The effect of the heat and pressure which is exerted by the die 16, when "Cellophane" is utilized, is to shape the cover member 50, and to provide circular corrugations therein, which intermesh with the corrugations 49 formed in the flange of the blank B.

Fig. 10 shows the corrugations 49<sup>a</sup> which are formed in the cover member 50.

Fig. 6 shows the grooves G<sup>a</sup> which are formed in the annular and downwardly projecting portion of the die 16. The heater H is provided with leads L.

As shown in Fig. 3, the standards 2 are bolted to angle members 60 which are connected to the base 1 by means of bolts 61.

While I have shown numerous specific details and improvements, the invention is not to be limited thereto, as it generally covers a machine and/or method of first shaping a flat sheet of material into a cup-shaped blank having a flange and then connecting a cover to said flange, preferably by means of interlocking corrugations.

Whenever I specify the formation of a cup-shaped blank, I do not wish to be limited to any particular shape, as "cup-shaped" is intended to cover any form or shape of hollow container.

For convenience I prefer to describe the die 27 as a lower die, and to describe the dies 14 and 16 as upper dies. However, the invention is not to be limited to a machine in which the superposed relation is maintained. Likewise, while I have shown continuous grooves in the top surface of the lower die, and in the bottom surface of the upper die 16, I do not wish to be limited to such continuous grooves, since the invention generally covers the idea of embossing or otherwise shaping the flange of the blank B and the cover, either continuously or at separated points.

Hence, whenever I refer to grooves in the claims, I do not wish to be limited to continuous grooves, and the term "grooves" generally covers one or more cooperating pairs of depressions and projections which emboss the flange of the blank and its cover.

I have shown a preferred embodiment of my invention, but it is clear that numerous changes and omissions could be made without departing from its spirit.

I claim:

1. Mechanism for forming a container, comprising a lower die having a recess, the top surface of said die adjacent the top of said recess having a plurality of grooves, and an upper die having a recess around said top surface, said upper die having a lower surface which contacts with said grooved surface of the lower die, said lower surface being spaced from recess of the lower die when such contact is made.

2. Mechanism for forming a container, said mechanism comprising a lower die having a recess, the top surface of said die adjacent the top of said recess having a plurality of grooves, and an upper die, means for heating said upper die, said upper die having grooves adapted to mesh with the grooves of the lower die.

3. Mechanism for forming a container, said mechanism comprising a lower die having a recess and a top surface around said recess, an upper die, means for heating the upper die, said upper die having a bottom surface adapted to press against said top surface, said surfaces having non-planar and cooperating recess-and-projection means for embossing the flange of a blank.

4. Mechanism for forming a container, said mechanism comprising a base, standards connected to said base, a rod mounted in said standards, an operating arm having a collar turnably mounted on said rod, a vertically movable upper block coupled to said arm, supplemental arms having collars turnably mounted on said rod, each said arm having a pair of links pivotally connected thereto and to a lateral face of said block, a first upper die and a second upper die connected to the underside of said upper block, the first upper die having a depending flange and a recess in the lower face of said first upper die which surrounds said flange, means for heating the second upper die, the second upper die having a portion of said lower face provided with groove means, a lower block slidably mounted on said base so that said lower block is horizontally slidable, means for sliding said lower block, a lower die mounted on said lower block and shiftable therewith, said lower block having a recess and a top surface at the top of said recess, the last-mentioned top surface having groove means adapted to cooperate with the first-mentioned groove means.

5. A method of making a container which consists in shaping a flat sheet of material to form a blank having a cup-shaped body and a flange, while forming plaits in the cup-shaped body and also forming outwardly radiating plaits in said flange, and then applying a cover to the flange and embossing the cover and the flange, so as to produce interconnecting plaits which cross said outwardly radiating plaits.

PHIL G. SCHLEMMER.